Levi Decker.

Cushion for Billiard-Tables.

No. 33,23. Reissued Mar. 9. 1869.

Witnesses.

Wm Treurn

Heo Fusch

Inventor.

Levi Decker

Per Munn & Co Atty's.

UNITED STATES PATENT OFFICE.

LEVI DECKER, OF NEW YORK, N. Y.

IMPROVEMENT IN CUSHIONS FOR BILLIARD-TABLES.

Specification forming part of Letters Patent No. 60,657, dated December 18, 1866; Reissue No. 3,323, dated March 9, 1869.

*To all whom it may concern:*

Be it known that I, LEVI DECKER, of the city, county, and State of New York, have invented new and useful Improvements in Cushions for Billiard-Tables; and I do hereby declare that the following is a full and exact description thereof, reference being had to the accompanying drawings, and to the letters of reference marked thereon.

My invention has for its object the preservaion of cushions for billiard-tables against the impact of the ball.

The nature of my invention consists in the employment or use of a catgut or other strong cord located in or at the upper corner or edge of the cushion, and immediately at the point against which the ball strikes when the game of billiards is played.

To enable others skilled in the art to make and use my invention, I will proceed to describe its construction.

Figure 3:
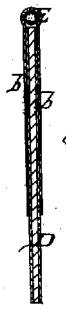
Figure 1:
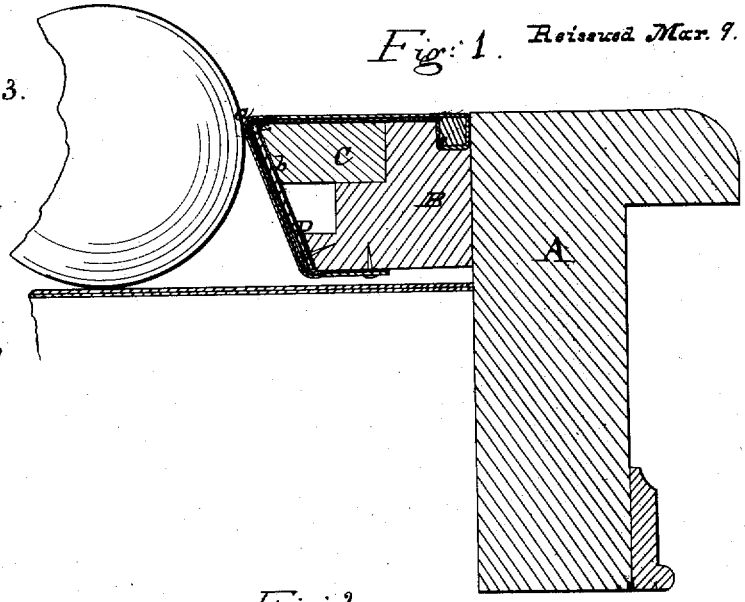
Figure 2:
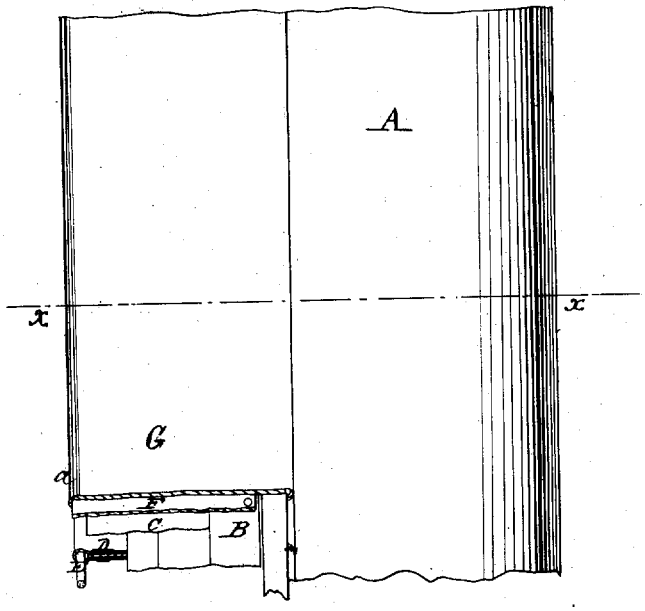

Figure 1 is a transverse vertical section of my invention, taken in the line *x x*, Fig. 2. Fig. 2 is a top plan view of Fig. 1. Fig. 3 is a detached view pertaining to the same.

Letters of like name and kind refer to like parts in each of the figures.

A represents a portion of one side of a billiard-table made in the common or ordinary way. B is a strip or cleat atttached to the inner surface of the upper part or portion of the table. This strip or cleat B forms an elevation above the surface of the table, so as to prevent the ball from rolling off while playing.

C is a body of rubber, which forms a cushion against which the ball strikes. This said rubber cushion has its inner or face side beveled in such a manner that the ball strikes at about its center against the upper corner or point of the cushion, as clearly shown at *a*, Fig. 1. For the purpose of protecting the upper corner or edge of the cushion C against the impact of the ball, I make a small concave or bed immediately, or as near as may be, in the upper corner of the cushion, so that a suitable cord, E, or other support may be fitted longitudinally the whole length of the said cushion around the table, so that the cushion is fully protected on all sides of the table against the impact of the ball. For this cord and support of the cushion I usually employ catgut; or cord may be used for the same purpose; but experience proves that catgut is most suitable for the purpose, as it is best adapted to prevent the cushion from giving way or yielding under the impact of the ball, it being understood that the ball only comes in contact with the cushion at *a*, the bevel or inclination being given the face of the cushion in order that all other parts of it will be kept clear of the ball. This cord E may be more thoroughly secured in its position by molding it or embedding it entirely within the rubber near the corner, so as to perform the functions for which it is designed; or it may be secured by gluing a strip of cloth, *b*, over it when not fully embedded in the rubber; or it may be secured by any other well-known means.

D is a strip of elastic cloth, which is cemented to the face side of the rubber strip or cushion C, and attached at its lower edge to the lower part of B, so as to support the upper edge, *a*, of *c*.

It will be understood that the cord E is attached to D before the latter is secured to the cushion C and cleat B. To make the whole more secure I usually cover the whole with the cloth F, and after cover the whole again with the usual green cloth, G. This cord E performs two very important functions, to wit: it gives stiffness to the angle or corner *a* of the cushion C, so that it cannot yield or give way under the impact of the ball to allow the latter to pass over it, and it also gives prominence to the said angle, so as to present under the yielding of the cushion a stiff narrow line to the ball, thus obviating much friction, so as not to impede the motion of the latter, and still not interfering in the least with the elastic effects of the cushion upon the ball.

Having thus described my invention, what I claim as new, and desire to secure by Letters Patent of the United States, is—

The catgut or other cord E, partially or fully embedded or otherwise attached at the angle *a* of the rubber cushion C, so as to protect said cushion against the impact of the ball, substantially as herein shown and described, and for the purposes set forth.

LEVI DECKER.

Witnesses:
S. B. WILSON,
A. S. WASS.